United States Patent
Shimizu et al.

(10) Patent No.: US 6,946,756 B2
(45) Date of Patent: Sep. 20, 2005

(54) OSCILLATORY LINEAR ACTUATOR

(75) Inventors: Hiroaki Shimizu, Kadoma (JP);
Hidekazu Yabuuchi, Kadoma (JP);
Masashi Moriguchi, Kadoma (JP);
Noboru Kobayashi, Kadoma (JP); Ryo Motohashi, Kadoma (JP); Ryuji Otani, Kadoma (JP)

(73) Assignee: Matsushita Electric Works, Ltd., Kadoma (JP)

( * ) Notice: Subject to any disclaimer, the term of this patent is extended or adjusted under 35 U.S.C. 154(b) by 65 days.

(21) Appl. No.: 10/462,664

(22) Filed: Jun. 17, 2003

(65) Prior Publication Data

US 2004/0046461 A1 Mar. 11, 2004

(30) Foreign Application Priority Data

Jun. 17, 2002 (JP) ........................................ 2002-176465

(51) Int. Cl.[7] .............................................. H02K 33/16
(52) U.S. Cl. ............................................ 310/12; 310/36
(58) Field of Search .............................. 310/12, 15, 17, 310/36, 38

(56) References Cited

U.S. PATENT DOCUMENTS

2005/0001491 A1 * 1/2005 Fujiwara et al.

FOREIGN PATENT DOCUMENTS

| DE | 26 03 681 | 8/1977 | |
| EP | 1 162 721 | 12/2001 | |
| JP | 11-136921 | 5/1999 | |
| JP | 2003134783 A * | 5/2003 | .......... H02K/33/02 |

OTHER PUBLICATIONS

Machine translation of Japanese reference H11–136921, Azusawa Shigekazu et al., May 21, 1999.*

* cited by examiner

*Primary Examiner*—Darren Schuberg
*Assistant Examiner*—Judson H. Jones
(74) *Attorney, Agent, or Firm*—Oblon, Spivak, McClelland, Maier & Neustadt, P.C.

(57) ABSTRACT

An oscillatory linear actuator including a plurality of movable elements configured to move in a linear direction, a stationary component configured to drive the plurality of movable elements to move in the linear direction, and a plurality of connecting devices elastically connecting the plurality of movable elements with each other and positioned on at least one end portion of the plurality of movable elements in the linear direction, each of the plurality of connecting devices being extending away from the plurality of movable elements in opposite directions.

16 Claims, 7 Drawing Sheets

OSCILLATORY LINEAR ACTUATOR

CROSS-REFERENCE TO RELATED APPLICATIONS

The present application claims priority to Japanese Patent Application No. 2002-176465, filed Jun. 17, 2002. The contents of that application are incorporated herein by reference in their entirety.

BACKGROUND OF THE INVENTION

1. Field of the Invention

The present invention relates to a linear actuator.

2. Discussion of the Background

Japanese Publication of Unexamined Patent Application No. 11-136921 discloses an oscillatory linear actuator which includes a chassis, two movable elements capable of moving in a reciprocal manner, two attaching members attaching the movable elements to the chassis at the ends of movable elements, respectively, and a single connecting body made of a flat spring attached to one end of the pair of movable elements via one of the attaching members. The connecting member is extending away from the movable elements in one direction, either upward or downward with respect to the movable elements.

SUMMARY OF THE INVENTION

According to one aspect of the present invention, an oscillatory linear actuator includes a plurality of movable elements configured to move in a linear direction, a stationary component configured to drive the plurality of movable elements to move in the linear direction, and a plurality of connecting devices elastically connecting the plurality of movable elements with each other and positioned on at least one end portion of the plurality of movable elements in the linear direction, each of the plurality of connecting devices being extending away from the plurality of movable elements in opposite directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The preferred embodiments will now be described with reference to the accompanying drawings, wherein like reference numerals designate corresponding or identical elements throughout the various drawings.

FIGS. 1–4 show one embodiment of an oscillatory linear actuator according to the present invention. Referring to FIGS. 1–4, the oscillatory linear actuator utilized, for example, as a drive motor in a reciprocating electric shaver, includes a stationary component 1, a pair of movable elements 2, 2, a chassis 3, and connecting bodies 12 connecting the pair of movable elements 2, 2.

Each of the movable elements 2, 2 is integrally formed by a yoke 5 (back yoke) made of a magnetic material, and a permanent magnet 4 is bonded to the yoke 5. Each movable element 2 also includes a connecting part 22 to which a movable blade is connected in the electric shaver. The connection part 22 is provided on an upper face of an arm 21 protruding in an L-shape from the upper face of each movable element 2 to its side. The pair of movable elements 2, 2 are installed in the chassis 3 such that the connection part 22 of one of the movable elements 2, 2 is positioned over the other movable element 2. That is, the arm 21 of one of the movable elements 2, 2 is protruding over the upper face of the other movable element 2.

The stationary component 1 is an electromagnet which is, for example, a sintered body of a magnetic material or laminated metal plates of a magnetic material to which a winding 7 is wound thereon via a bobbin 16. The stationary component 1 is fastened to the chassis 3, for example, by screws.

The movable elements 2, 2 are suspended over the chassis 3 by connection plates 9, 9 each formed by a flat spring. The permanent magnets 4 and the stationary component 1 face each other with a gap 8 formed therebetween. The upper ends of the connection plates 9 are fastened to bridge plates 10 fixed onto the chassis 3, while lower ends 11 of the connection plates 9 are fastened to the movable elements 2, 2. The bridge plates 10 also function as a fixing member when the oscillatory linear actuator is installed in the electric shaver. Thus, the movable elements 2, 2 are suspended by the connection plates 9, 9 with elasticity.

Figure 1:
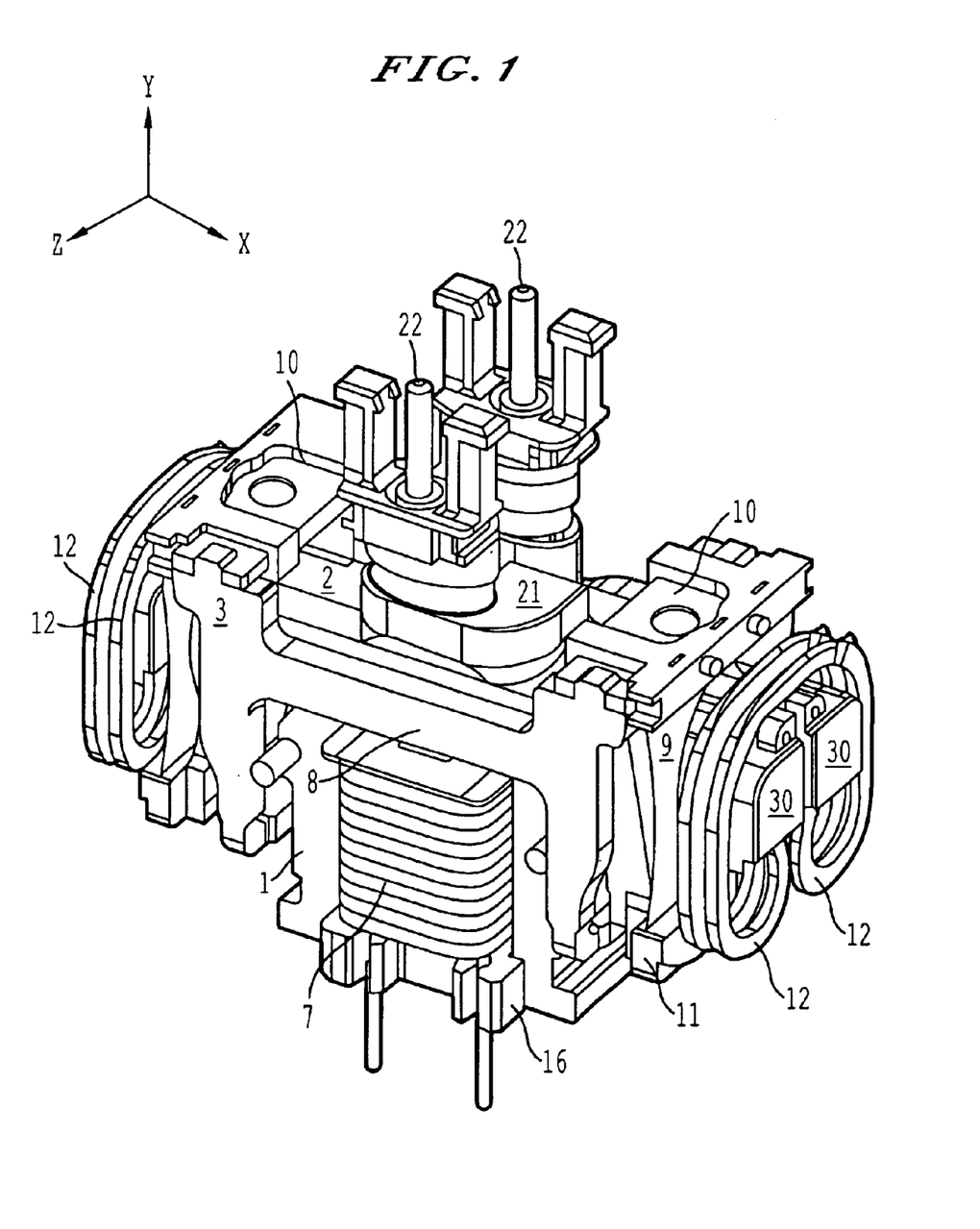
FIG. 1 is a perspective view of an embodiment according to the present invention.
Figure 2:
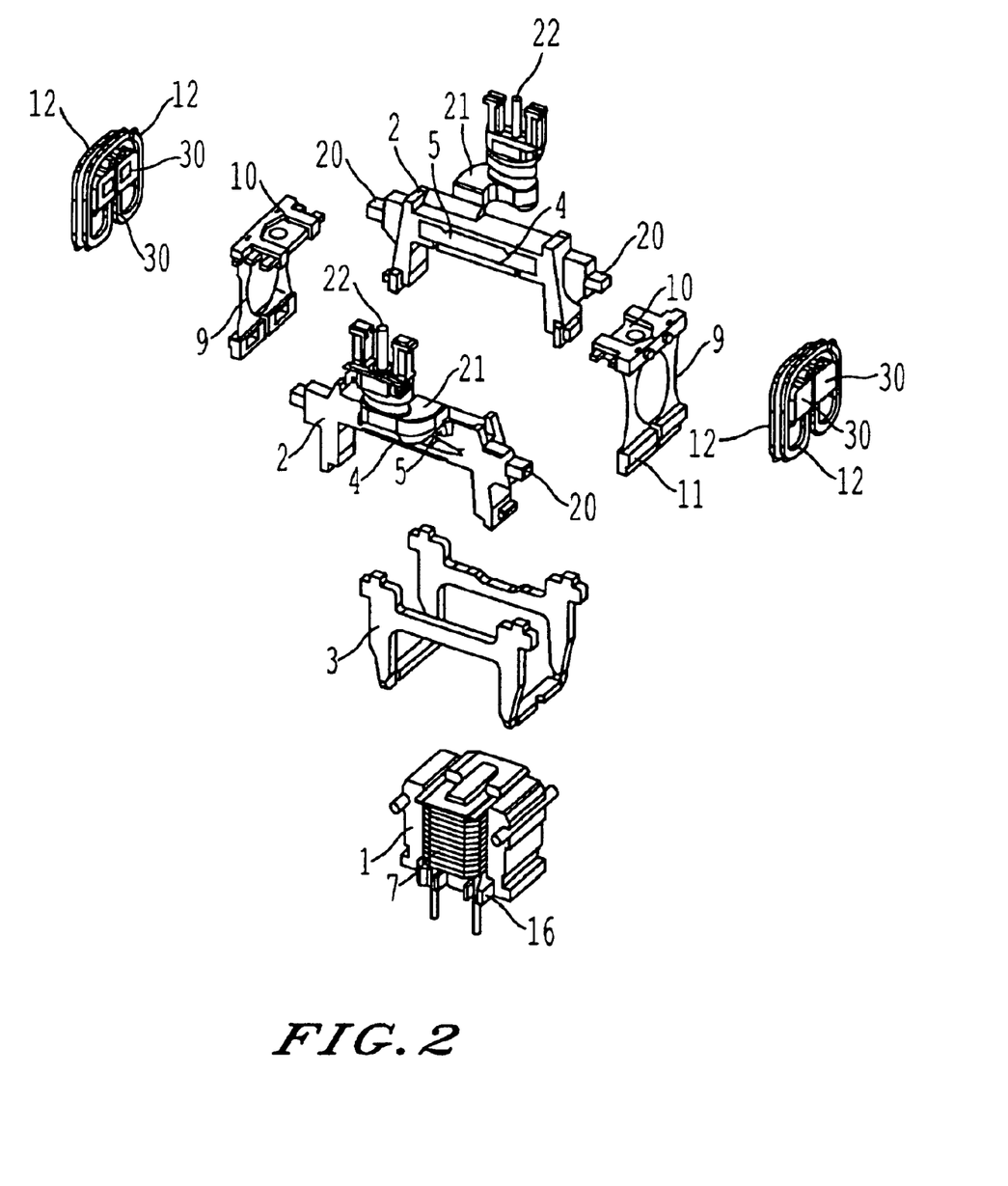
FIG. 2 is an exploded perspective view of the embodiment shown in FIG. 1.

Further, in FIGS. 1 and 2, the movable elements 2, 2 have the same shape and are provided in parallel to each other in a manner such that the arms 21, 21 protrude outward from the pair of movable elements 2, 2. When the direction of electric current flowing in the stationary component 1 formed by an electromagnet is alternated, an attractive force or a repulsive force is generated between the stationary component 1 and the permanent magnet 4. Thus, the movable elements 2, 2 reciprocally move while flexing the connecting plates 9. When the winding 7 of the electromagnet in the stationary component 1 is a single winding, the moving direction of the movable elements 2, 2 are switched between rightward and leftward by inversing the flow of electric current. That is, the movable elements 2, 2 are driven to reciprocate by flowing the electric current in the directions which provides the driving force directed to their respective moving directions.

Since the permanent magnet 4 of one movable element 2 has the polarity which is opposite to that of the permanent magnet 4 of the other movable element 2, the reciprocal movements of the pair of movable components 2, 2 have a phase difference of 180° from each other. Hence, vibration in the direction of the reciprocal movements is minimized.

The two movable elements 2, 2 are connected to each other by the connecting body 12 formed by a spring, and the connecting body 12 moves in the direction of the reciprocal movement of the movable elements 2, 2. In this embodiment, the connecting body 12 is an elongated flat spring having a substantially U-shape with its extending portions further extending and looping toward the end portion of the movable elements 2, 2 inside the U-shape and positioned on a plane perpendicular to the oscillatory movement of the movable elements 2, 2, i.e., the elongated flat spring is substantially encircling the end portion of the movable elements 2, 2 and looping inward toward the end portion of the movable elements 2, 2. Further, four connecting bodies 12 are utilized to connect the two movable elements 2, 2 to each other. Specifically, two connecting bodies 12, 12 are directly attached to one end of the movable elements 2 at the ends of the extending portions inside the U-shape, and the other two connecting bodies 12, 12 are similarly attached at the other end of the movable elements 2, 2. Because of these connecting bodies 12, when the amplitude of one of the movable elements 2, 2 in motion is about to be drastically decreased due to a large load imposed thereto, the movement of the other movable element 2 more efficiently prevents such a decrease. As a result, the movable elements 2, 2 move more efficiently in a well-balanced and stable amplitude. In addition, the connecting bodies 12 serve to set up and maintain a certain frequency of each movable element 2 in motion.

When the connecting bodies 12 are the flat springs formed as such, installation requires smaller spaces without compromising their effectiveness, thus making the oscillatory linear actuator more compact. That is, when the connecting bodies 12 are shaped as shown in FIG. 1, the connecting bodies 12 are made longer and the entire elongated length of each connecting body 12 functions more effectively as an elastic body. Hence, a smaller flat spring may be used to provide a sufficient spring length. Furthermore, because the four connecting bodies 12, two connection bodies 12 at each end of the movable elements 2, 2, are provided, stress imposed on each of the connecting bodies 12 is significantly reduced, prolonging their durabilities.

Alternatively, three or more connecting bodies 12 may be provided at each end of the movable elements 2, 2, or three or more connecting bodies 12 may be provided at one end of the movable elements 2, 2 and none at the other end. In either case, stress imposed on each of the connecting bodies 12 is reduced significantly.

Figure 3:
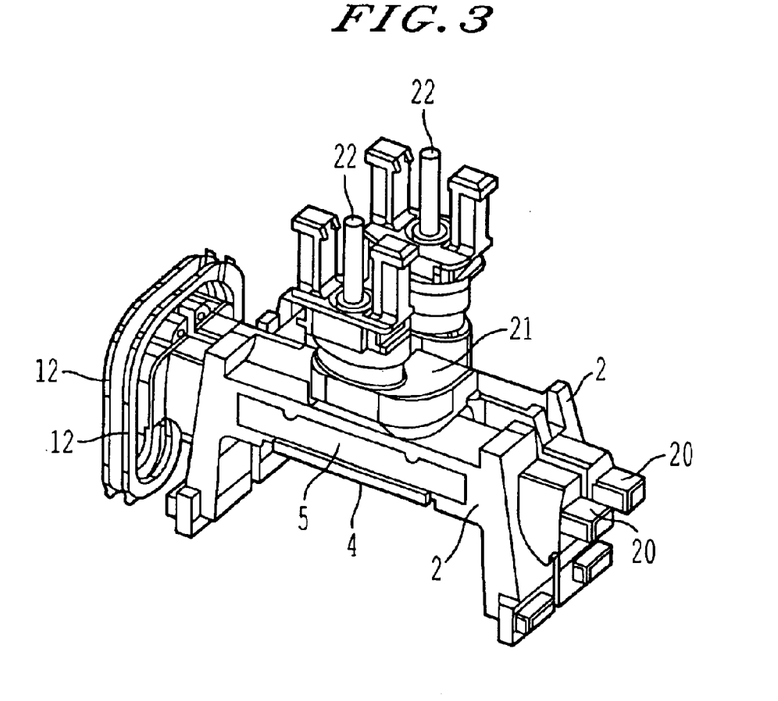
FIG. 3 is another perspective view of the embodiment shown in FIG. 1.
Figure 4:
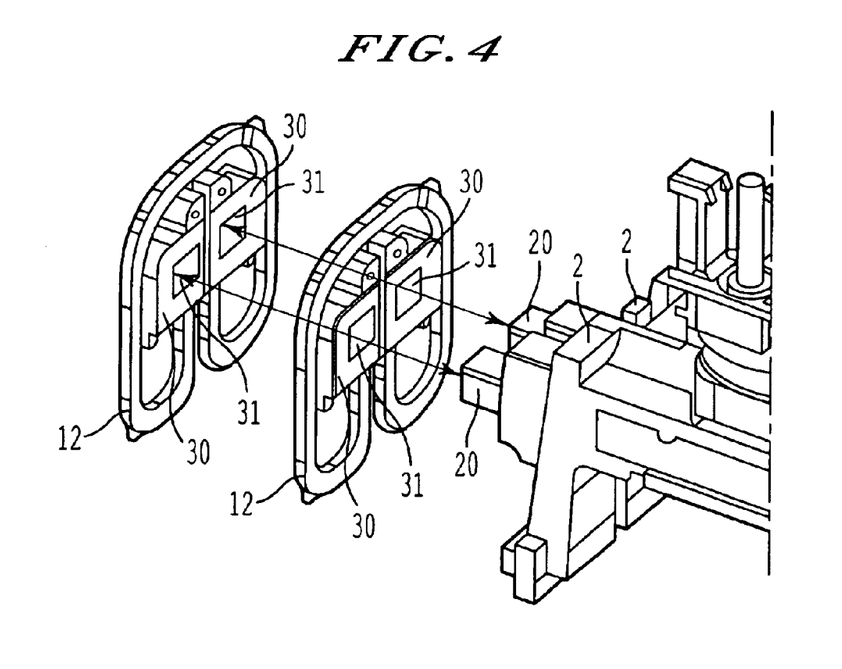
FIG. 4 is another exploded perspective view of the embodiment shown in FIG. 1.

Further, as illustrated in FIGS. 3 and 4, the connecting body 12 may be provided with a fixing link member 30 (hereinafter referred to as "link member") having a connecting hole 31 at the terminal portions of the U-shaped connecting body 12. The movable element 2 may be provided with a protruding connector 20 protruding from the end of the movable element 2. As such, the connecting body 12 is connected to the movable element 2 by engaging the protruding connector 20 into the connecting hole 31. Among the two connecting bodies 12, 12 provided at each end of the movable elements 2, 2, the connection holes 31 of the connecting bodies 12, 12 positioned inside toward the movable elements 2, 2 (hereinafter referred to as "inner connecting bodies") are formed such that the protruding connectors 20 are inserted through the connection holes 31, respectively. The connection holes 31 of the two connecting bodies 12, 12 positioned outside away from the movable elements 2, 2 (hereinafter referred to as "outer connecting bodies") are engaged with the protruding connectors 20, and their link members 30 are fixed to the protruding connectors 20, respectively, for example, by welding, screws, or adhesive. As a result, the link members 30 of the inner connecting bodies 12 are also fixedly held between the movable elements 2, 2 and outer connecting bodies 12. Also, the connection holes 31 of the outer connecting bodies 12, 12 serve to determine the positions of the outer connecting bodies 12, 12 from the movable elements 2, 2, and fix the outer connecting bodies 12, 12 by welding or adhesive, thereby effectively reducing their connecting portions to the movable elements 2, 2.

Figure 5:
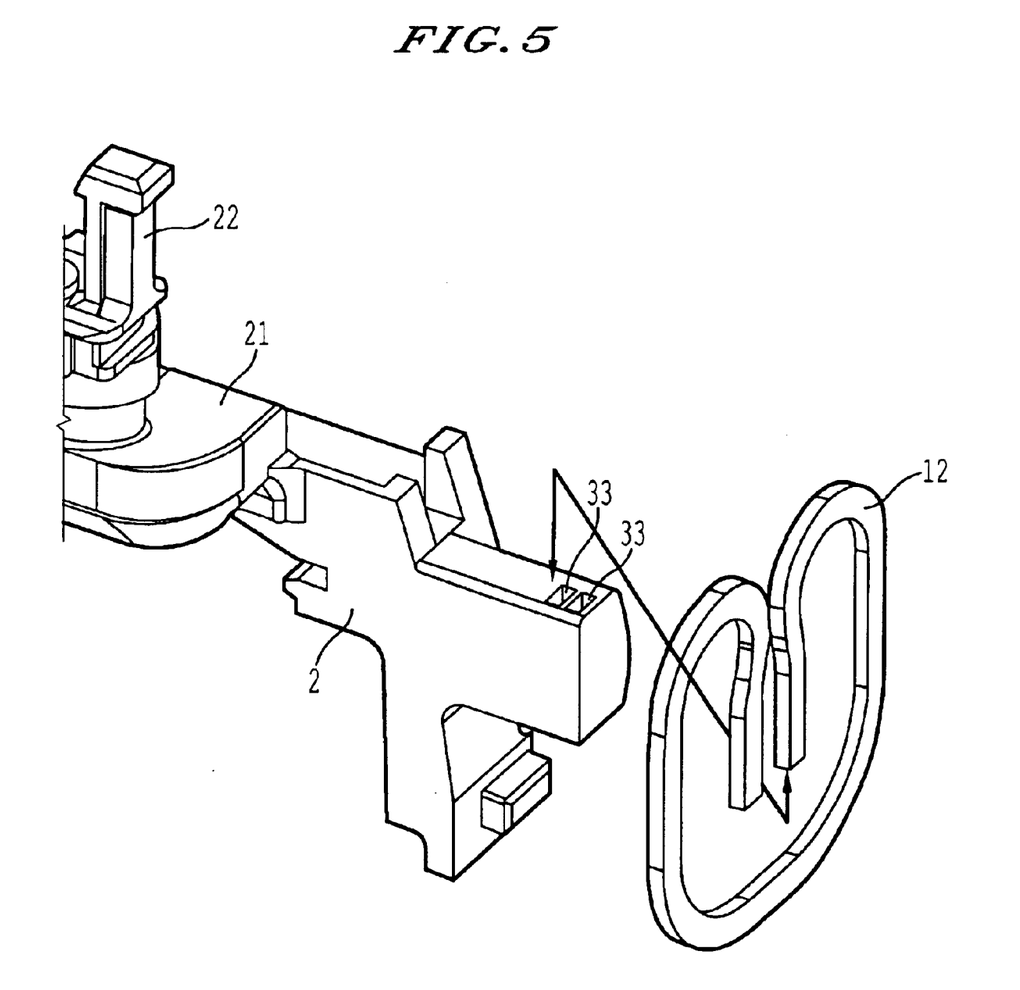
FIG. 5 is an exploded perspective view of another embodiment according to the present invention.
Figure 6:
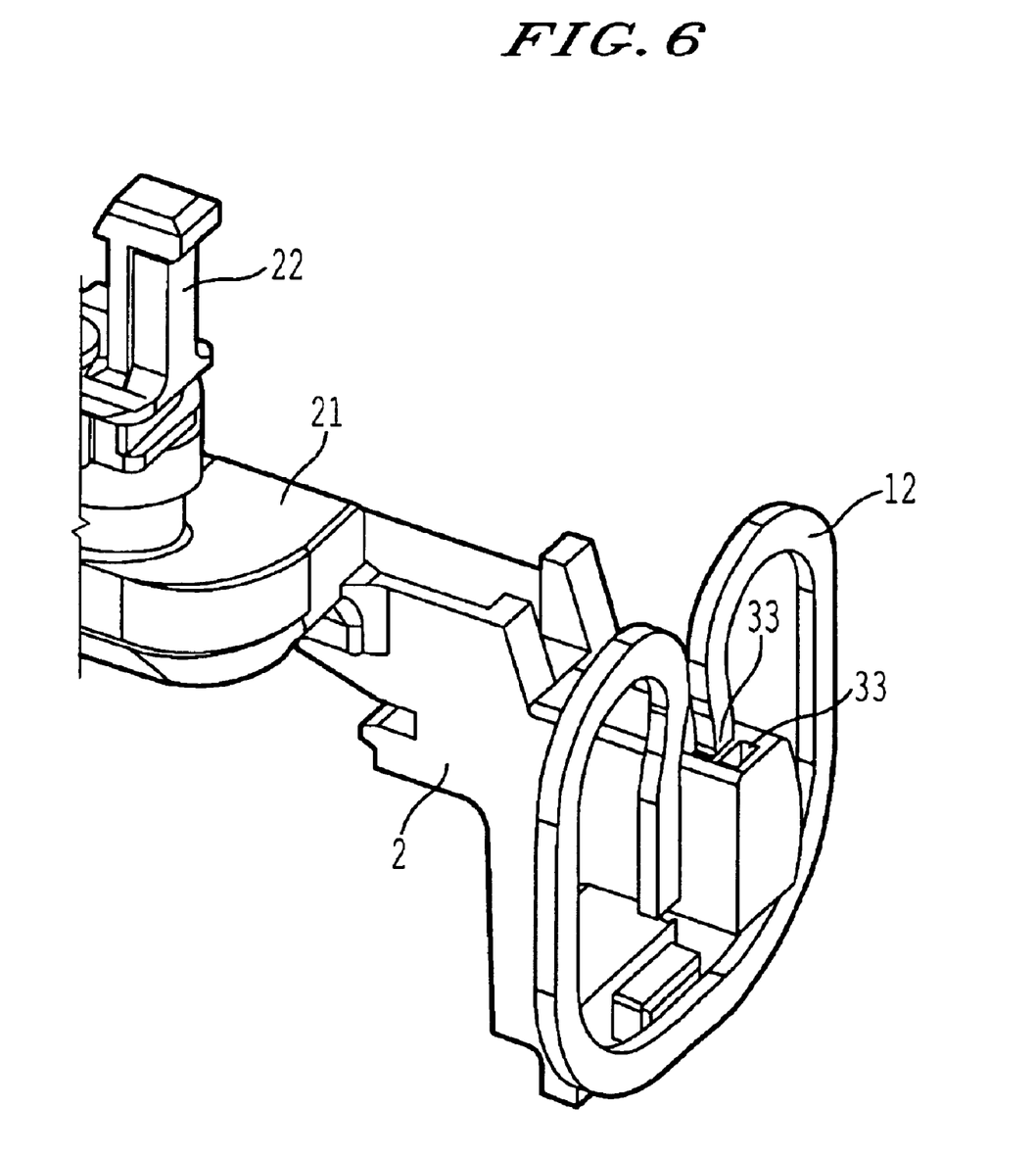
FIG. 6 is a perspective view of the embodiment shown in FIG. 5.

FIGS. 5 and 6 show another embodiment according to the present invention. Referring to FIGS. 5 and 6, each of the connecting bodies 12, 12 is another elongated substantially U-shaped flat spring with its extending portions further extending and looping toward inside, and the movable elements 2, 2 have holes 33, 33 at their end portions. The terminal portions of the U-shaped connecting bodies 12, 12 are inserted into the holes 33, 33 of the movable elements 2, 2, respectively, thereby connecting the movable elements 2, 2 and connecting bodies 12, 12.

Figure 7:
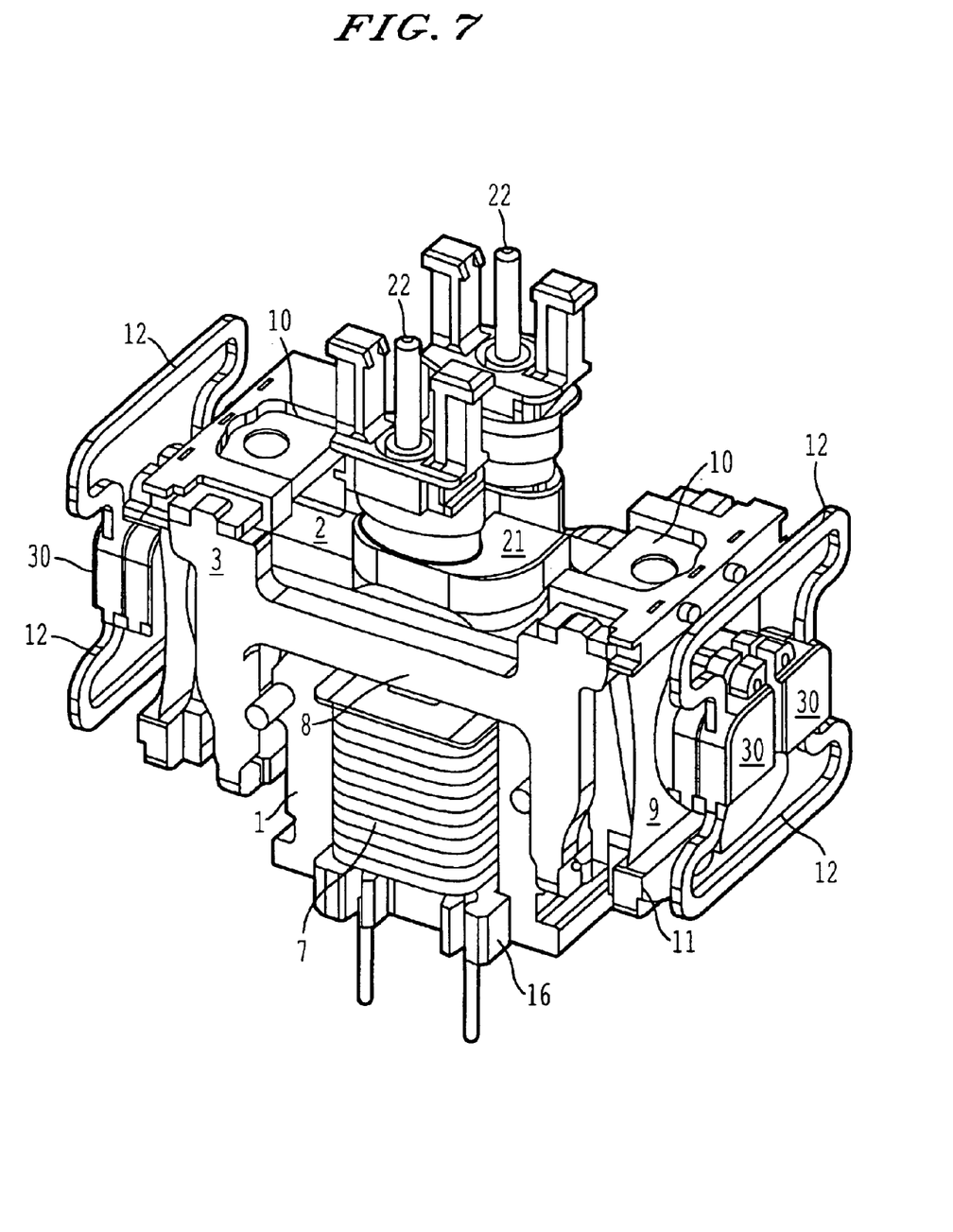
FIG. 7 is a perspective view showing still another embodiment according to the present invention.

FIG. 7 is a perspective view showing still another embodiment according to the present invention. Referring to FIG. 7, unlike the previous embodiments in which the two connecting bodies 12, 12 of the U-shaped flat springs are positioned in the oscillatory direction of the movable elements 2, 2, each of the connecting bodies 12 is yet another elongated flat spring having thickness in the oscillatory direction of the movable elements 2, 2 and two connecting bodies 12, 12 are positioned in a single plane perpendicular to the oscillatory direction. Each of the connecting bodies 12 shown in FIG. 7 has a substantially U-shape with extending portions further extending toward each other and turned parallel to each other toward the end portion of the movable elements 2, 2. According to this embodiment, spaces for the flexure of the connection bodies 12, 12 in the oscillatory direction is not required between the connecting bodies 12, 12, thus further reducing the size in the oscillatory direction.

In addition, according to the embodiment shown in FIG. 7, two connecting bodies 12, 12 share common link members 30, 30 at their terminal portions for connecting to the movable elements 2, 2, making it more simple to fix them to the movable elements 2, 2.

In FIG. 7, the two movable elements 2, 2 are horizontally provided, and the connecting bodies 12, 12 are symmetrically disposed on the upper and lower sides of the movable elements 2, 2. However, when the two movable elements 2, 2 are vertically provided, the connecting bodies 12, 12 may be provided on their right and left sides. As long as the two connecting bodies 12, 12 are disposed on a single plane, the size of the oscillatory linear actuator according to this embodiment is reduced in the oscillatory direction.

Figure 8:
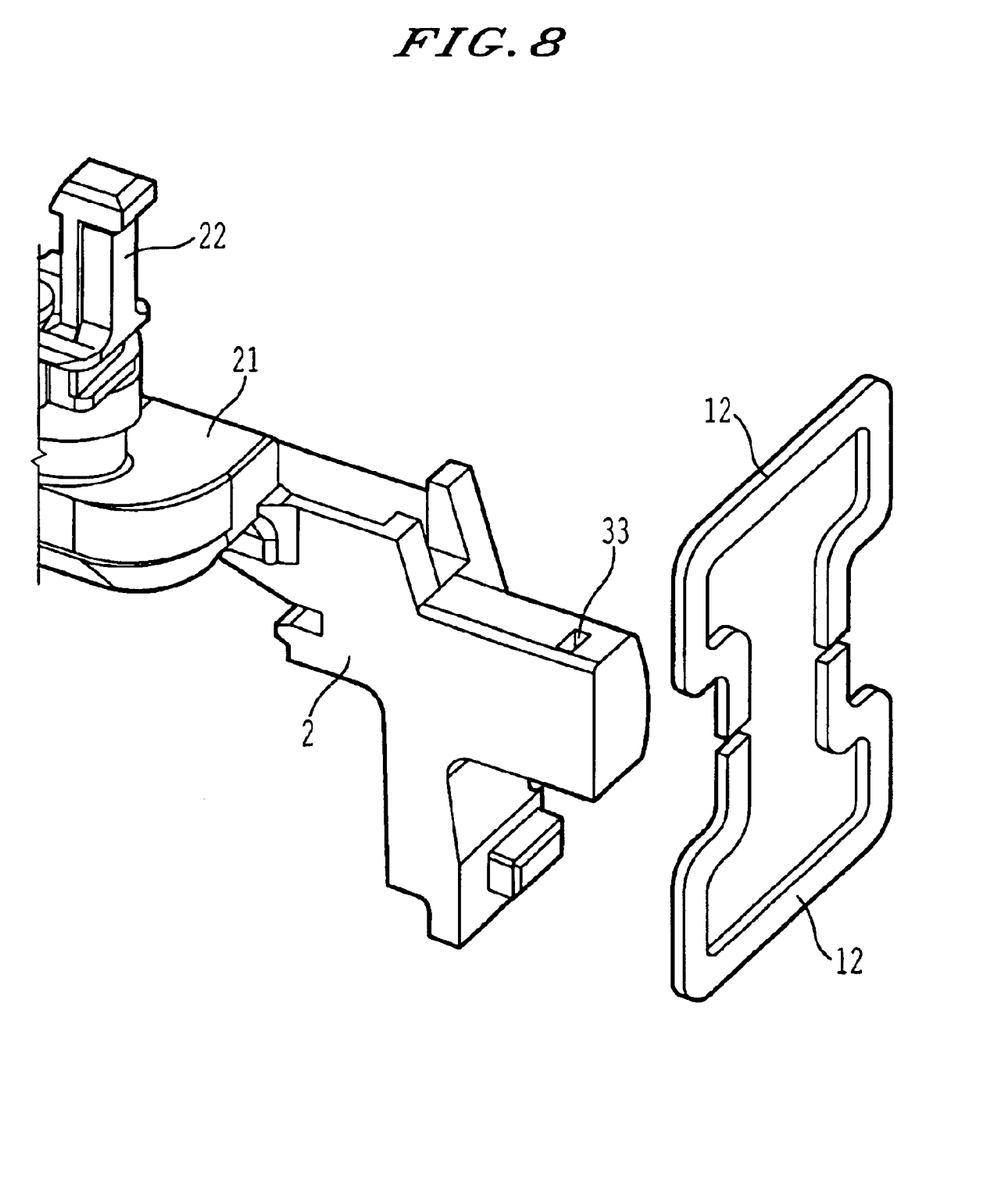
FIG. 8 is a perspective view showing yet another embodiment according to the present invention.

FIG. 8 is a perspective view showing yet another embodiment according to the present invention. Referring to FIG. 8, a hole 33 communicating vertically through the movable element 2 is provided at the end portion of the movable element 2. Thus, the terminal portions of the connecting bodies 12, 12 are inserted into the hole 33 from the upper and lower sides of the movable element 2, thereby allowing the connecting bodies 12, 12 to be fixed, for example, by tight fitting or welding. According to this embodiment, a multiple number of the connecting bodies 12, 12 are connected to the movable elements 2, 2 with a less number of parts in a simple structure. Also, because a multiple number of the connecting bodies 12 are connected to the same portion of the movable element 2, the connecting portions are reduced in size.

Although the embodiments described above show oscillatory linear actuators which are suitable for a reciprocating electric shaver, an oscillatory linear actuator according to the present invention are not limited to a drive motor for a reciprocating electric shaver but is applicable as a drive motor for various devices.

Obviously, numerous modifications and variations of the present invention are possible in light of the above teachings. It is therefore to be understood that within the scope of the appended claims, the invention may be practiced otherwise than as specifically described herein.

What is claimed is:

1. An oscillatory linear actuator comprising:
   a plurality of movable elements configured to move in a linear direction;
   a stationary component configured to drive the plurality of movable elements to move in the linear direction; and
   a plurality of connecting devices elastically connecting the plurality of movable elements with each other and positioned on at least one end portion of the plurality of movable elements in the linear direction, the plurality of connecting devices comprising at least one outer connecting device fixed to the at least one end portion of the plurality of movable elements and at least one inner connecting device provided between the at least one outer connection body and the plurality of movable elements.

2. An oscillatory linear actuator according to claim 1, wherein:
   the plurality of movable elements each have a protruding portion at the at least one end portion thereof; and
   the plurality of connecting devices each have a linking aperture engaging with the protruding portion for attaching to the plurality of movable elements.

3. An oscillatory linear actuator according to claim 1, wherein:
   the plurality of movable elements each have a protruding portion at the at least one end portion thereof;
   the plurality of connecting devices each have a linking aperture engaging with the protruding portion for attaching to the plurality of movable elements;
   the plurality of connecting devices comprises at least one outer connecting device fixed to the at least one end portion of the plurality of movable elements and at least one inner connecting device provided between the at least one outer connection body and the plurality of movable elements; and
   the linking aperture of the at least one inner connecting body is a through hole engaging with the protruding member.

4. An oscillatory linear actuator according to claim 1, wherein said plurality of connecting devices have engaging portions engaging with apertures provided on the at least one end portion of the plurality of movable elements, respectively.

5. An oscillatory linear actuator according to claim 1, wherein the plurality of connecting devices is positioned on a single plain perpendicular to the linear direction.

6. An oscillatory linear actuator according to claim 5, wherein the plurality of connecting devices comprises an upper connecting device and a lower connecting device positioned above and below the plurality of movable elements provided side by side in a horizontal direction.

7. An oscillatory linear actuator according to claim 5, wherein the plurality of connecting devices are attached to the at least one end portion of the plurality of movable elements at the seine position in the linear direction.

8. An oscillatory linear actuator according to claim 1, wherein the plurality of connecting devices each comprise a spring body which sets an intrinsic frequency of the plurality of movable elements.

9. An oscillatory linear actuator according to claim 1, wherein the plurality of connecting devices each comprise a single flat spring.

10. An oscillatory linear actuator according to claim 1, wherein the plurality of connecting devices each comprise a single flat spring substantially encircling a respective one of the at least one end portion of the plurality of movable elements in the linear direction.

11. An oscillatory linear actuator according to claim 1, wherein the plurality of connecting devices each comprising a single flat spring having a substantially U-shaped portion and extending portions further extending from end portions of the substantially U-shaped portion and looping toward inside the substantially U-shaped portion.

12. An oscillatory linear actuator according to claim 1, wherein the plurality of connecting devices each comprise a plurality of single flat springs.

13. An oscillatory linear actuator according to claim 1, wherein the plurality of connecting devices each comprise a plurality of single flat springs positioned to substantially encircle a respective one of the at least one end portion of the plurality of movable elements in the linear direction.

14. An oscillatory linear actuator according to claim 1, wherein the plurality of connecting devices each comprising a plurality of single flat springs, each of the plurality of single flat springs having a substantially U-shaped portion and extending portions further extending from end portions of the substantially U-shaped portion and turned toward the at least one end portion of the plurality of movable elements.

15. An oscillatory linear actuator according to claim 1, wherein the plurality of connecting devices each comprising a plurality of single flat springs, each of the plurality of single flat springs having a substantially U-shaped portion and extending portions further extending from end portions of the substantially U-shaped portion and turned parallel to each other toward the at least one end portion of the plurality of movable elements.

16. An oscillatory linear actuator according to claim 1, wherein the plurality of connecting devices are extending substantially symmetrically with respect to the plurality of movable elements.

* * * * *

UNITED STATES PATENT AND TRADEMARK OFFICE
CERTIFICATE OF CORRECTION

PATENT NO. : 6,946,756 B2
DATED : September 20, 2005
INVENTOR(S) : Hiroaki Shimizu et al.

It is certified that error appears in the above-identified patent and that said Letters Patent is hereby corrected as shown below:

Column 6,
Line 9, change "seine" to -- same --.

Signed and Sealed this

Tenth Day of January, 2006

JON W. DUDAS
*Director of the United States Patent and Trademark Office*